(12) United States Patent
Nowak

(10) Patent No.: US 9,704,531 B2
(45) Date of Patent: Jul. 11, 2017

(54) CREATING COMPOSITION OF CONTENT CAPTURED USING PLURALITY OF ELECTRONIC DEVICES

(71) Applicant: Benjamin Nowak, Atlanta, GA (US)

(72) Inventor: Benjamin Nowak, Atlanta, GA (US)

( * ) Notice: Subject to any disclaimer, the term of this patent is extended or adjusted under 35 U.S.C. 154(b) by 0 days.

(21) Appl. No.: 14/883,303

(22) Filed: Oct. 14, 2015

(65) Prior Publication Data

US 2016/0111128 A1    Apr. 21, 2016

Related U.S. Application Data

(60) Provisional application No. 62/064,464, filed on Oct. 15, 2014.

(51) Int. Cl.

| | | |
|---|---|---|
| *H04N 5/93* | (2006.01) | |
| *G11B 27/031* | (2006.01) | |
| *G11B 27/10* | (2006.01) | |
| *H04N 5/232* | (2006.01) | |
| *H04N 5/247* | (2006.01) | |
| *H04N 9/87* | (2006.01) | |
| *H04N 5/265* | (2006.01) | |
| *H04W 4/00* | (2009.01) | |
| *H04N 5/77* | (2006.01) | |

(52) U.S. Cl.
CPC ............ *G11B 27/031* (2013.01); *G11B 27/10* (2013.01); *H04N 5/23206* (2013.01); *H04N 5/23238* (2013.01); *H04N 5/247* (2013.01); *H04N 5/265* (2013.01); *H04N 5/77* (2013.01); *H04N 9/87* (2013.01); *H04W 4/008* (2013.01)

(58) Field of Classification Search
CPC ...... G11B 27/031; G11B 27/10; H04N 5/247; H04N 5/23206; H04N 9/87
USPC ........................ 386/278, 281, 282, 285, 290
See application file for complete search history.

(56) References Cited

U.S. PATENT DOCUMENTS

| | | |
|---|---|---|
| 8,717,422 B2 | 5/2014 | Hewes et al. |
| 2008/0143875 A1 | 6/2008 | Scott et al. |
| 2012/0319997 A1 | 12/2012 | Majumder |
| 2013/0209059 A1 | 8/2013 | Scheele et al. |
| 2013/0216155 A1 | 8/2013 | Lim et al. |
| 2013/0259446 A1 | 10/2013 | Sathish |
| 2013/0300933 A1 | 11/2013 | Thorson |

(Continued)

FOREIGN PATENT DOCUMENTS

WO    WO 2014/093668    6/2014

*Primary Examiner* — Robert Chevalier
(74) *Attorney, Agent, or Firm* — Bekiares Eliezer LLP; Yuri L. Eliezer, Esq.

(57) ABSTRACT

Disclosed is a master electronic device configured to create a composition based on content captured using a plurality of client electronic devices. The master electronic device may include each of a communication module, a playback module, a touch-enabled input module and a composition module. The communication module may be configured to receive a plurality of content streams from a plurality of client electronic devices. The playback module may be configured to synchronously playback the plurality of content streams. The touch-enabled input module may be configured to receive one or more composition-inputs during the playback of the content. The one or more composition-inputs may correspond to a selection of a content stream to be included in a composition. Accordingly, the composition module may be configured to create the composition based on the one or more composition-inputs.

27 Claims, 7 Drawing Sheets

(56) References Cited

U.S. PATENT DOCUMENTS

| | | |
|---|---|---|
| 2014/0186004 A1 | 7/2014 | Hamer |
| 2014/0240469 A1 | 8/2014 | Lee |
| 2014/0355947 A1 | 12/2014 | Slamecka et al. |
| 2014/0355951 A1 | 12/2014 | Tabak |
| 2015/0143239 A1 | 5/2015 | Birkbeck et al. |

CREATING COMPOSITION OF CONTENT CAPTURED USING PLURALITY OF ELECTRONIC DEVICES

RELATED APPLICATIONS

Under the provisions of 35 U.S.C. §119(e), this application claims priority from provisional patent application No. 62/064,464, filed on Oct. 15, 2014 which is incorporated herein by reference in its entirety.

Related U.S. patent application Ser. No. 14/883,262, filed on even date herewith in the name of the present inventor and entitled "CONTROLLING CAPTURE OF CONTENT USING ONE OR MORE CLIENT ELECTRONIC DEVICES," is hereby incorporated by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF THE INVENTION

Generally, the disclosure relates to electronic devices. More specifically, the disclosure relates to methods, systems and devices or controlling capture of content using one or more client electronic devices.

BACKGROUND

There are several situations where content needs to be captured using two or more content capturing devices. For example, in film production, it is common to use a multiple camera setup for capturing visual content of a scene. The multiple camera setup includes two or more cameras positioned at different spatial coordinates. Accordingly, the scene may be recorded from two or more different viewpoints. Such multi-camera systems often require a substantial level of technical expertise, director supervision, and a significant amount of post-production editing.

For example, in order to produce a final composition of content captured using the two or more content capturing devices, complex post-production editing is generally required. Videos obtained from the two or more cameras in the multiple camera setup may be subjected to synchronization and stitching under supervision of a human editor. As a result, a final video including visual content captured from different viewpoints may be obtained. This process of stitching is complex, time consuming and burdensome. Moreover, processing content captured using two or more content capturing devices involves the use of complex processing tools. For example, postproduction editing of the videos obtained from the multiple camera setup require complex and expensive video processing software.

Accordingly, there is a need for improved methods, systems and devices for capturing content using two or more content capturing devices.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Disclosed is a master electronic device configured to create a composition based on content captured using a plurality of client electronic devices. The master electronic device may include a communication module configured to receive content from a plurality of client electronic devices. The content may include a plurality of content streams corresponding to each of the plurality of client electronic devices. Further, the master electronic device may include a playback module configured to playback the content received from the plurality of client electronic devices. The playback may include a synchronized playback of the plurality of content streams. Additionally, the master electronic device may include a touch-enabled input module configured to receive one or more composition-inputs during the playback of the content. The one or more composition-inputs may correspond to a selection of a content stream to be included in a composition. Furthermore, the master electronic device may include a composition module configured to create the composition based on the one or more composition-inputs.

In some embodiments, the playback module may be further configured to playback the content streams associated with the plurality of client electronic devices within a plurality of client display regions. Further, the playback module may also be configured to playback the selected content stream within a composition display region.

In some embodiments, the playback of the selected content stream within the composition display region may continue from a time of playback of the selected content stream within the client display region when the one or more composition-inputs corresponding to the selected content stream was received.

In some embodiments, the playback module may be further configured to replace, within the composition display region, the playback of previously-selected content stream with a playback of a currently selected content stream.

Further, in some embodiments, the composition module may be configured to stitch together each content stream selected by the one or more composition-inputs at playback times corresponding to the playback of each content stream within the composition display region.

Also disclosed is a method of creating a composition based on content captured using a plurality of client electronic devices. Initially, content from the plurality of client electronic devices may be received, with a communication module. The content may include a plurality of content streams corresponding to each of the plurality of client electronic devices. Subsequently, the method may include playing back, with a playback module, the content received from the plurality of client electronic devices. In an instance, the playing back of the content from each of the plurality of client electronic devices may be synchronous. Thereafter, one or more composition-inputs may be received, with a touch-enabled input module, during the playing back of the content. Further, the one or more composition-inputs may correspond to a selection of the content stream to be included in the composition. Subsequently, the composition may be created, with the composition module, based on the one or more composition-inputs.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
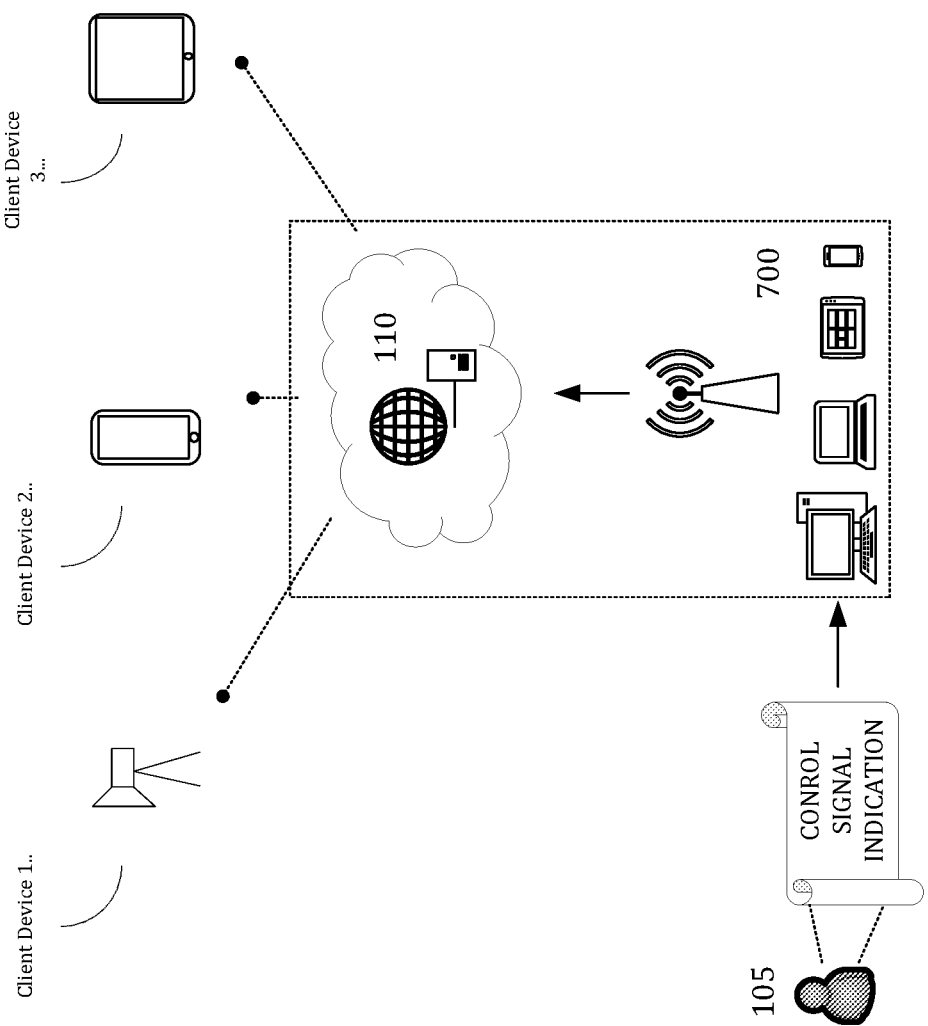
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of film production, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope. The methods, systems and devices for creating composition of content captured using a plurality of electronic devices may be used by individuals or companies to create a composition based on content captured using a plurality of electronic devices.

According to techniques described in the present disclosure, users may be enabled to create a composition based on content captured using a plurality of electronic devices. For example, the plurality of electronic devices may be a plurality of smart phones including video cameras. Accordingly, a video composition may be created based on a plurality of videos captured by the plurality of smart phones. A user, called a "director" may be enabled to create the video composition by operating a master electronic device, such as for example, a tablet computer. Further, one or more users called as "camera persons" may be enabled to capture content collaboratively using one or more client electronic devices.

In order to create the video composition, the plurality of videos captured by the plurality of smart phones may be transmitted to the master electronic device over a communication channel such as for example Wi-Fi or Bluetooth. Subsequently, the plurality of videos may be displayed on a display screen of the master electronic device. The plurality of videos may be displayed in a split screen form. In other words, the display screen of the master electronic device may be partitioned into a plurality of client display regions. Further, each video of the plurality of videos may be displayed on a designated client display region. Moreover, the plurality of videos may have been captured synchronously. Accordingly, the displaying of the plurality of videos may also be performed synchronously. For instance, the plurality of videos may correspond to videos of an event captured synchronously from different viewpoints. Further, a starting time of each video of the plurality of videos may be identical. Similarly, an ending time of each video of the plurality of videos may also be identical. As a result, synchronously displaying the plurality of videos may enable the director to view the event from different viewpoints.

Additionally, a portion of the display screen called a composition display region may be provided for facilitating creation of the video composition. In some instances, the composition display region may be larger than each of the client display regions in order provide a better viewing experience to the director.

Further, the director may be enabled to select portions of the plurality of videos synchronously displayed on the master electronic device in order to create the video composition. For instance, while the plurality of videos are playing, the director may be enabled to touch a client display region on the display screen corresponding to a portion of a video that the director wishes to include in the video composition. Subsequently, the selected video may be displayed in the composition display region from a time when the touch was received. Accordingly, the portion of the video along with corresponding time values may be determined and stored. Similarly, the director may be enabled to indicate portions of other videos to be included in the video composition. When the director touches a subsequent client display region corresponding to a subsequent video, the previously displayed video in the composition display region may be replaced with the subsequent video.

Subsequently, the portions of videos selected by the director may be stitched together to form the video composition. Further, the director may be provided with options to view and edit the video composition by performing operations such as adding transition effects at boundaries of different portions of videos, applying special effects such as overlaying images on the video composition and deleting or adding portions of the video composition.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. The operating environment may comprise methods, systems, and devices collectively referred to as a platform. The platform may include a master electronic device and a client electronic device. The platform may further include computing devices in operative communication with the master electronic device and the client electronic device. Moreover, the platform may include a networking environment for facilitating communication between the master electronic device, client electronic device, and various computing devices. Although the present disclosure refers to various functions and operations performed by particular components of the platform (e.g., a master electronic device or client electronic devices), it should be understood that some platform components may be interchanged with others, and/or, where necessary, combined with other components to perform the functions and operations intended.

By way of non-limiting example, a composition creation platform 100 may be interconnected using a network 110. In some embodiments, network 110 may comprise Bluetooth, Wi-Fi etc. In other embodiments, the composition creation platform 100 may be hosted on a centralized server, such as, for example, a cloud computing service. A user 105 (e.g., director) may access platform 100 through a software application. The software application may be embodied as, for example, but not be limited to, a website, a web application, a desktop application, and a mobile application compatible with a computing device 700700. One possible embodiment of the software application may be provided by a camera app included in an electronic device such as, for example, smart phone, tablet computers etc.

As will be detailed with reference to FIG. 1 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

The computing device 700 may be configured to communicate with each of client devices 1-3 over the network 110. Further, the computing device 700 may be configured to provide a user interface to the user 105. Accordingly, the user 105 may interact with the computing device in order to control content capturing by the client devices 1-3 and subsequently receiving the captured content. For example, the computing device 700 may display a GUI to the user 105 in order to select one or more of the client devices 1-3 to participate in a collaborative recording of content. Further, the GUI may enable the user 105 to enter commands corresponding to controlling capture of content such as for example, initiation of content capture, pausation of content capture and termination of content capture. Accordingly, a command entered by the user 105 may then be transmitted to the client devices 1-3 over network 110. Upon receiving the command, the client devices 1-3 may perform a content capturing operation dictated by the command. Subsequently, the content captured by the client devices 1-3 may be transferred to the computing device 700 over network 110. As a result, the user 105 may be able to consume the content recorded collaboratively and subsequently create the composition based on the content received from the one or more client devices.

Figure 2:
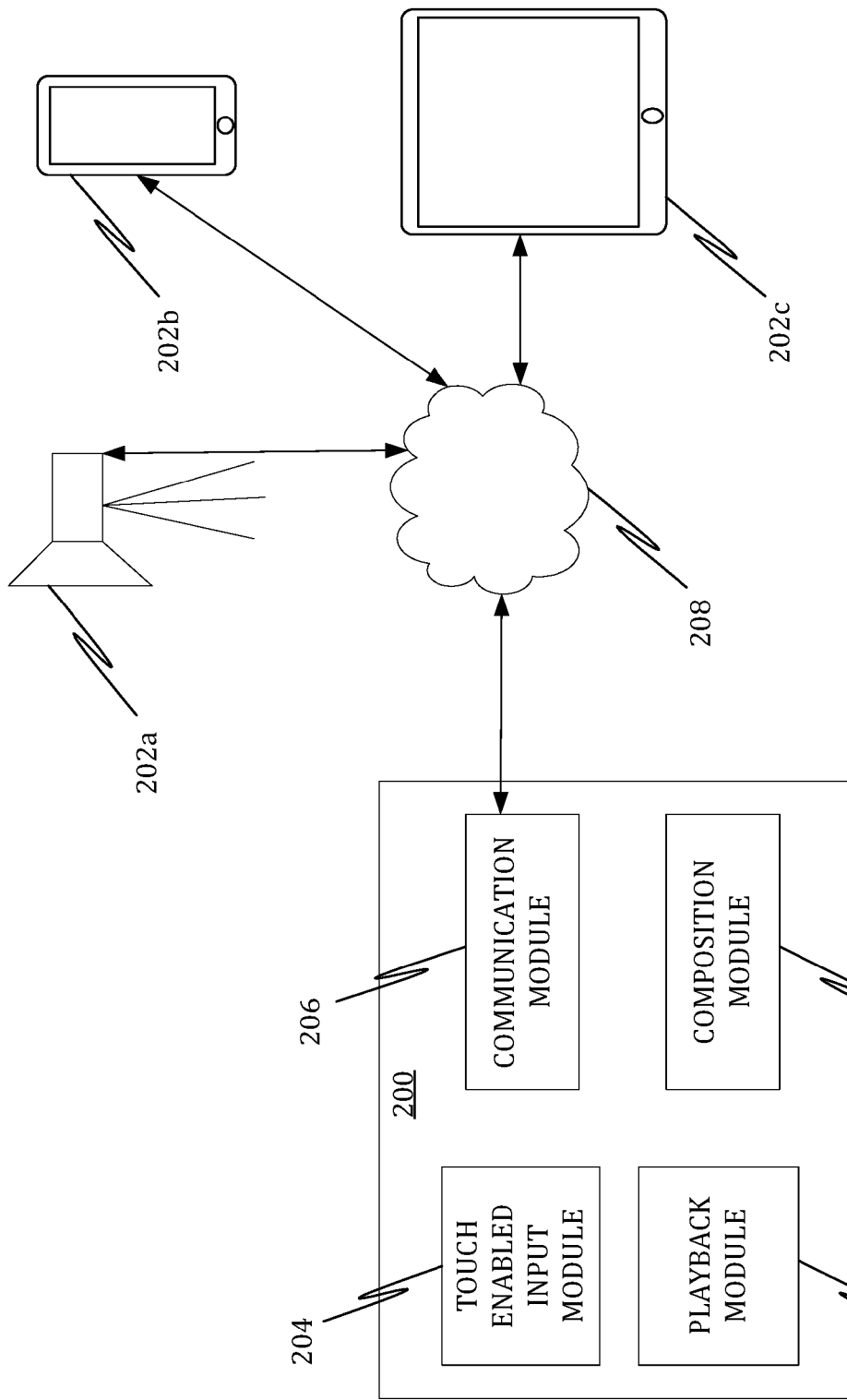
FIG. 2 illustrates a master electronic device configured to create a composition based on content captured using one or more client electronic devices according to some embodiments.

FIG. 2 illustrates a master electronic device 200, according to some embodiments, configured to create a composition based on content captured using one or more client electronic devices 202 such as 202a, 202b and 202c. The master electronic device 200 may include a means to receive one or more composition-inputs. In some embodiments, the means to receive the one or more composition-inputs may include a touch-enabled input module 204, as exemplarily illustrated. In some embodiments, the touch-enabled input module 204 may include a Graphical User Interface (GUI) presented on a display device, such as, a touch-screen of the master electronic device 200. In another embodiment, the touch-enabled input module 204 may be replaced by an input device such as, but not limited to, a keyboard, a mouse, a touch-pad, a stylus, a digital pen, a voice recognition device, a gesture recognition device and a gaze detection device. In some embodiments, the touch-enabled input module 204 may be implemented using one or more of hardware and software. Examples of hardware include, but are not limited to, sensors and processors.

Further, in some embodiments, the one or more composition-inputs may be based on touch. Accordingly, the touch-enabled input module 204 may be configured for presenting a touch based Graphical User Interface (GUI). For instance, the master electronic device 200 may include a touch screen configured to display the touch based GUI.

In general, the one or more composition-inputs may be any input that determines how content captured by two or more electronic devices are to be combined to create the composition. Examples of the two or more electronic devices include, but are not limited to, still image camera, video camera, smart-phone, tablet computer, laptop computer, sound recorder and thermal imager. Additional details with regard to the electronic devices are provided in the concurrently filed patent application, Ser. No. 14/883,262, filed on even date herewith in the name of the present inventor and entitled "CONTROLLING CAPTURE OF CONTENT USING ONE OR MORE CLIENT ELECTRONIC DEVICES," is hereby incorporated by reference.

Further, an electronic device of the two or more electronic devices may include a content capturing means configured to capture content. In general, the content may include a representation of one or more physical characteristics. For example, in an instance, the content may include visual content. Accordingly, the content may be a representation of optical characteristics such as, but not limited to, reflectance, transmittance, luminance and radiance. For instance, visual content corresponding to a scene may include electronic representation, such as, for example, a digital representation, of reflectance of visible light from one or more objects in the scene as captured from two or more viewpoints. Accordingly, the two or more electronic devices may be positioned at different spatial coordinates corresponding to the two or more viewpoints.

Examples of content may include one or more of, but not limited to, image, video and audio. In some embodiments, the content may correspond to, but without limitation, one or more sensory modalities. The one or more sensory modalities may include visual modality, auditory modality, tactile modality, olfactory modality and gustatory modality.

In order to capture the content, the content capturing means may include one or more sensors configured for sensing one or more physical characteristics corresponding to the content. For example, the content capturing means may include an image capturing device configured for sensing electromagnetic radiation in a scene and generating a corresponding electronic representation. Further, the image capturing device may be configured for sensing electromagnetic radiation corresponding to one or more wavelength bands. As an example, the image capturing device may be a video camera configured for sensing electromagnetic radiation in the visible spectrum. As another example, the image capturing device may be configured for sensing electromagnetic radiation in the infrared spectrum. In another embodiment, the content capturing means may include a microphone configured for sensing sound waves and generating a corresponding electronic representation such as, for example, a digital representation.

In some embodiments, the two or more electronic devices may include each of the master electronic device 200 and one or more client electronic devices 202, exemplarily illustrated as 202a, 202b and 202c. In another embodiment, the two or more electronic devices may include two or more client electronic devices 202. Further, in some embodiments, an electronic device of the two or more electronic devices may be interchangeably used as either the master electronic device 200 or the client electronic device 202.

In some embodiments, the one or more composition-inputs may include a selection of content captured by a client electronic device of the one or more client electronic devices 202. Accordingly, in some embodiments, content captured by the one or more client electronic devices 202 may be presented on the master electronic device 200. Additionally, in some embodiments, the master electronic device 200 may further include a means to communicate data, such as communication module 206, between the master electronic device 200 and the one or more client electronic devices 202. Accordingly, in some embodiments, the communication module 206 may be configured to receive content from a plurality of client electronic devices 202. Further, the content may include a plurality of content streams corresponding to each of the plurality of client electronic devices 202.

Further, the communication module 206 may be configured to communicate data over one or more communication channels 208. Accordingly, the one or more client electronic devices 202 may include corresponding one or more communication modules configured to communicate over the one or more communication channels 208, exemplarily illustrated as communication channel 208. The one or more communication channels 208 may include one or more of a common local-area-network connection, a Wi-Fi connection, and a Bluetooth connection. For example, the communication module 206 may include a Bluetooth transceiver configured to perform one or more of transmission and reception of data over a Bluetooth communication channel.

As another example, the communication module 206 included in the master electronic device 200 such as, for example, a smart-phone, may be a cellular transceiver configured to perform one or more of transmission and reception of radio frequency signals over a cellular communication network. As yet another example, the communication module 206 may include a network interface module configured for communicating over a packet switched network such as, for example, the Internet. In some embodiments, each of the master electronic device 200 and the one or more client electronic devices 202 may be configured to communicate over an ad-hoc wireless network. Accordingly, the master electronic device 200 may be configured to transmit a request to the one or more client electronic devices 202 to form the ad-hoc wireless network. In some embodiments, the master electronic device 200 may communicate data with the one or more client electronic devices 202 over a personal area network (PAN).

In an instance, the communication may include wireless reception of content captured by the one or more client electronic devices 202. For instance, content such as a plurality of video streams captured by each of the one or more client electronic devices 202 may be received by the master electronic device 200.

In some embodiments, the master electronic device 200 may include a presentation means, exemplarily illustrated as a playback module 210, configured to play back each of the content captured by the one or more client electronic devices 202 and the content captured by the master electronic device 200. Alternatively, in another embodiment, the presentation means, exemplarily illustrated as a playback module 210, may be configured to play back content captured by two or more client electronic devices 202 of the one or more client electronic devices 202. For instance, the playback module 210 may be configured to playback the content received from the plurality of client electronic devices 202. Further, the playback may include a synchronized playback of the plurality of content streams. In other words, in some embodiments, the synchronized playback includes playing each content stream of the plurality of content streams according to a common timeline associated with each content stream. For instance, the common timeline may be the timeline during which each of the content streams was captured by the one or more client electronic devices 202.

In some embodiments, the playback module may also be configured for decoding content prior to playing it. For instance, the content captured by the one or more client electronic devices 202 may be a video encoded in a predetermined format such as MPEG. Accordingly, the playback module may include an MPEG decoder for decoding the video. In general, the playback module may be implemented using one or more of, but not limited to, a processor and a presentation device, such as for example, a display device and an audio speaker. Additionally, in some embodiments, the playback module 210 may include software, such as a media player, configured for playing content.

Figure 3:
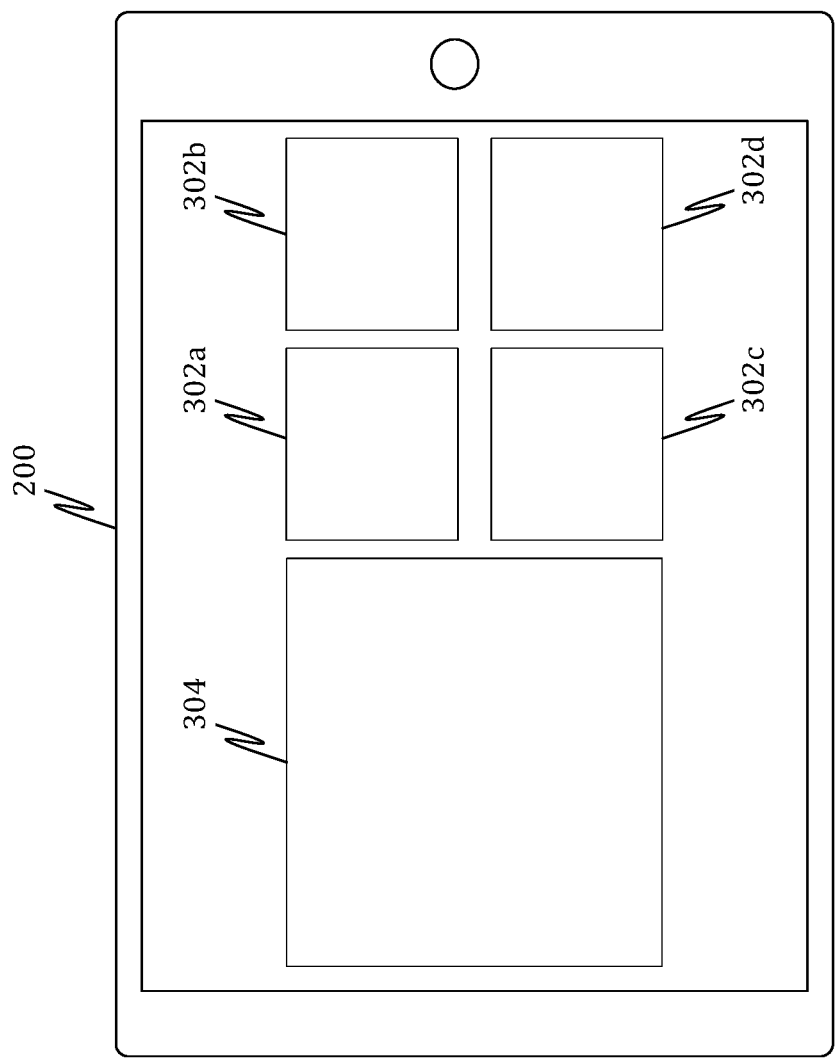
FIG. 3 illustrates display screen of a master electronic device configured to create a composition based on content captured using one or more client electronic devices according to some embodiments.

In some embodiments, the playback module may be further configured to playback the content streams associated with the plurality of client electronic devices 202 within a plurality of client display regions 302, exemplarily illustrated as 302a-302d in FIG. 3. Additionally, the playback module may be configured to playback a selected content stream within a composition display region 304. In an instance, the composition display region 304 may be substantially larger than each of the plurality of client display regions 302. In another instance, the composition display region 304 may be similar in size compared to each of the plurality of client display regions 302. For example, a display screen of the master electronic device 200 may be divided into a plurality of display tiles of equal size. Further, the display screen may be configured to display the plurality of content streams in the plurality of display tiles.

Additionally, in some embodiments, the display screen may be configured to display a content captured by the master electronic device 200 in a display tile of the plurality of display tiles. In yet another instance, the composition display region 304 may occupy the entire display screen of the master electronic device 200. Further, the touch-enabled input module 204 may be configured to receive a client-selection input from a user operating the master electronic device 200. The client-selection input may identify a client electronic device of the one or more client electronic devices 202. Accordingly, the playback module 210 may be configured to play a content stream captured by the client electronic device identified by the client-selection input.

In some embodiments, the playback of the selected content stream within the composition display region 304 may continue from a time of playback of the selected content stream within the client display region 302 when the one or more composition-inputs corresponding to the selected content stream were received. For instance, consider the content stream corresponding to a client electronic device 202 being played in the client display region 302a of a touch sensitive display screen.

Further, consider the one or more composition-inputs to be a touch input received on the client display region 302a at a time $T_n$. Accordingly, the playback module 210 may be configured to play the content stream from time $T_n$ onwards in the composition display region 304. In an instance, the playback module 210 may be configured to continue playing the content stream in the client display region 302a subsequent to receiving the one or more composition-inputs. However, in another instance the playback module 210 may be configured to discontinue playing the content stream in the client display region 302a subsequent to receiving the one or more composition-inputs. Further, in yet another instance, the playback module may be configured to use the client display region 302a to display another content stream of the plurality of content streams subsequent to receiving the one or more composition-inputs.

In another instance, the playback module may be configured to repartition the plurality of client display regions 302 subsequent to receiving the one or more composition-inputs. Accordingly, for instance, screen estate corresponding to the selected content stream may be freed to display content streams of the other client electronic devices 202 in larger size.

In some embodiments, subsequent to receiving the touch input corresponding to a content stream captured by a client electronic device, the client display region corresponding to the content stream may be designated as the composition display region. Accordingly, an indication may be provided to notify the user of the master electronic device 200 that the client display region is the composition display region. The indication may be provided, for example, by enhancing a border of the client display region. Thereafter, when the user of the master electronic device 200 selects a subsequent content stream, the client display region designated as the composition display region may be updated to display the subsequently selected content stream.

In some embodiment, the playback module may be further configured to replace, within the composition display region 304, the playback of previously-selected content stream with a playback of a currently selected content stream. For instance, consider a first selection input received by the touch-enabled input module in the form of a touch input on the client display region 302a at a time $T_n$ while content is being played. Further, consider the client display region 302a to be corresponding to a first client electronic device of the one or more client electronic devices 202. Accordingly, subsequent to receiving the first selection input, the selected content stream continues to play in the composition display region 304 from time $T_n$ onwards. As a result, the user of the master electronic device may be provided with a better viewing experience of the content stream captured by the first client electronic device. Subsequently, a second selection input may be received by the touch-enabled input module in the form of a touch input on the client display region 302b at a time $T_m$.

Further, consider the client display region 302b to be corresponding to a second client electronic device of the one or more client electronic devices 202. Accordingly, subsequent to receiving the second selection input, the previously selected content stream corresponding to the first client electronic device may be replaced by the currently selected content stream corresponding to the second client electronic device. Consequently, the playback module 210 may be configured to continue playing the content stream captured by the second client electronic device within the composition display region 304 subsequent to receiving the second selection input. Further, in some embodiments, subsequent to replacing the previously selected content stream with the currently selected content stream, the playback module 210 may be configured to continue playing the previously selected content stream within the corresponding client display region. For instance, subsequent to receiving the second selection input, the playback module 210 may be configured to continue playing the previously selected content stream in client display region 302a.

In some embodiments, the master electronic device 200 may further include a composition module 212 configured to stitch together each content stream selected by the one or more composition-inputs at playback times corresponding to the playback of each content stream within the composition display region 304. In some embodiments, the composition module 212 may include a processor such as a digital signal processor (DSP). Further, in some embodiments, the composition module 212 may include media processing software such as a video processing tool.

For instance, consider the case where the first selection input is received at a time $T_n$ to select the content stream corresponding to the first client electronic device and the second selection input is received later at a time $T_m$ to select the content stream corresponding to the first client electronic device. Further, consider the content stream corresponding to the second client electronic device to end at $T_o$. Accordingly, the composition module 212 may be configured to stitch content stream from the first client electronic device corresponding to time duration $(T_m-T_n)$ to the content stream from the second client electronic device corresponding to time duration $(T_o-T_m)$ in order to create the composition.

Figure 4:
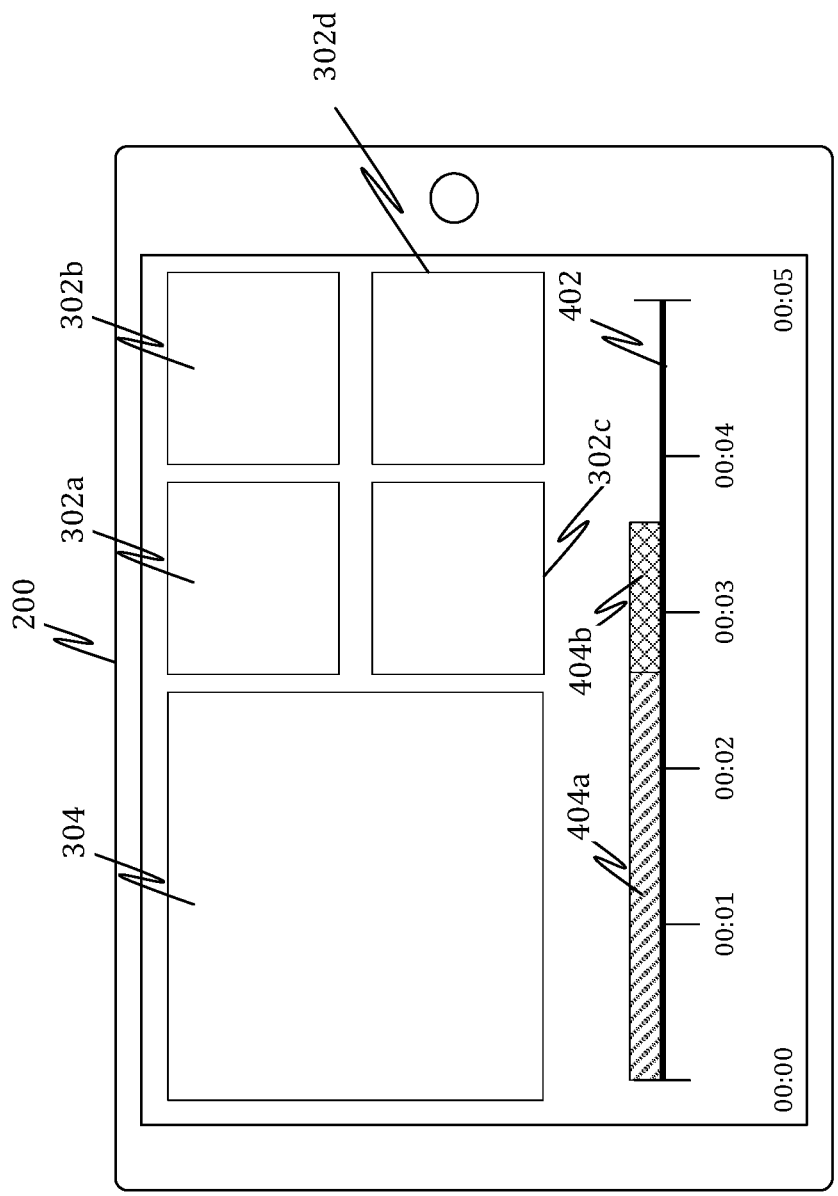
FIG. 4 illustrates display screen of a master electronic device configured to create a composition based on content captured using one or more client electronic devices according to another embodiment.

Accordingly, in some embodiments, the playback module may be configured to display a graphical timeline corresponding to the composition such as graphical timeline 402 exemplarily illustrated in FIG. 4. Further, the playback module may be configured to display a content representation 404 corresponding to the content streams included in the composition. For instance, a content representation 404a corresponding to the content stream from the first client electronic device and content representation 404b corresponding to the content stream from the second client electronic device may be displayed illustrated. In an instance, the content representation may include thumbnail-images from corresponding content streams sampled at regular time intervals. As a result, in some embodiments, a user of the master electronic device 200 may be able to view contents of the composition while creation of the composition is in progress.

Further, in some embodiments, the composition module 212 may be configured to process the composition based on an editing input. Accordingly, the touch-enabled input module 204 may be configured to receive the editing input from a user of the master electronic device 200. In an instance, the editing input may include indication of a content processing to be performed on a selected content stream of the plurality of content streams. For instance, if the selected content stream includes a video stream, the content processing may include operations such as, but not limited to, spatial transformations such as flipping, rotating, cropping etc., colour transformations such as gray-scale conversion, colour correction etc., resizing, filtering and special effects such as overlaying one content over another.

In another embodiment, the editing input may include an indication of a transition effect to be used while transitioning from one content stream to another content stream included in the composition. The transition effect may include, one or more of, but is not limited to, cuts, fades, wipes, dissolves, box-in and box-out. For example, while playing back the composition, the contents of which correspond to content representation 404a and 404b, a transition effect such fades may be used. Accordingly, as playback of the content stream corresponding to the first client electronic device approaches time $T_n$, the playback may be faded out. Subsequently, at time $T_m$, the content stream corresponding to the second client electronic device may be faded-in during playback.

In a further embodiment, the editing input may include an indication of a special effect to be applied onto one or more of the plurality of content streams and the composition. For example, the special effects may include effects such as transforming a portion of a content stream of the plurality of content streams. In an instance, the indication of the special effect may be received during playback of the plurality of content streams. For example, the playback module 210 may be configured to display GUI elements corresponding to one or more special effects on a touch sensitive display screen. Accordingly, the user of the master electronic device 200 may activate a GUI element corresponding to a special effect desired by the user while playback of a content stream is in progress. Consequently, subsequent to activating the GUI element, the content stream may be processed based on the special effect and played. In some embodiments, the special effect may be applied onto the content stream from the time at which the indication of the special effect is received.

In another embodiment, the master electronic device 200 may be a smart phone including a touch screen display configured to display content such as, for example, video captured by the one or more client electronic devices 202 such as tablet computers. Further, the touch screen display may be configured to concurrently display each of video captured by the smart phone and video captured by the tablet computers. For instance, the smart phone may be configured to display video captured by the smart phone on a first display region of the touch screen display and concurrently display video captured by the tablet computers on a second display region of the touch screen display. As a result, a user of the master electronic device 200 may be able to view a scene captured from different viewpoints.

Further, the content captured by each of the one or more client electronic devices 202 and the master electronic device 200 may include video. Accordingly, the playback module 210 may be configured to synchronously display each of a video captured by the master electronic device 200 and a video captured by the one or more client electronic devices 202. For example, each of the content captured by the master electronic device 200 and the content captured by the one or more client electronic devices 202 may correspond to a common time duration. Further, the master electronic device 200 may be configured to display content captured by each of the master electronic device 200 and the one or more client electronic devices 202 concurrently on separate display regions of the display screen.

In another embodiment, the playback module 210 may be configured to synchronously display each of a video captured by the master electronic device 200 and a video captured by the one or more client electronic devices 202. Further, the playback module 210 may be configured to display the video captured by the master electronic device 200 on a master display region of the display means. Additionally, the playback module 210 may be configured to display the video captured by the one or more client electronic devices 202 on one or more client display regions of the display means.

In another embodiment, the one or more client electronic devices 202 may include two or more client electronic devices 202. Accordingly, the display means may be configured to display the video captured by a first client electronic device of the two or more client electronic devices 202 on a first client display region of the one or more client display regions of the display means. Further, the display means may be configured to display the video captured by a second client electronic device of the two or more client electronic devices 202 on a second client display region of the one or more client display regions of the display means.

Subsequently, the user operating the master electronic device 200 may perform a selection of content captured by the client electronic device. For instance, the content captured by the client electronic device may correspond to a viewpoint preferred by the user. Similarly, in another instance, content captured by the one or more client electronic devices 202 may be selected. As an example, consider a case where each of the master electronic device 200, a first client electronic device and a second client electronic device of the one or more client electronic devices 202 are capturing a scene including one or more physical objects. Further, each of the master electronic device 200, the first client electronic device and the second client electronic device may be located at different positions and therefore may capture content from different viewpoints.

Moreover, content captured by each of the master electronic device 200, the first electronic device and the second electronic device may be displayed on the master electronic device 200. Accordingly, the user operating the master electronic device 200 may choose content corresponding to a viewpoint preferred by the user. For instance, the user may select content captured by each of the master electronic device 200 and the first client electronic device. In some embodiments, the user may provide a touch input on a region of the display screen corresponding to content captured by the one or more client electronic devices 202. For example, the user may provide a touch input on a region of the display screen displaying the content captured by the first client electronic device. Accordingly, the content captured by the first electronic device may be selected.

In another embodiment, the selection of content captured by the client electronic device corresponds to a time instant. For example, the time instant may correspond to the time at which the touch input is provided by the user to perform the selection. For instance, the user may provide the touch input on a region of the display screen displaying the content, such as a video, captured by the first client electronic device at time of 10 seconds from the start of the video. Accordingly, one or more frames having timestamps around the 10 seconds mark from the beginning of the video may be selected. In another instance, the user may provide the touch input for a time duration. Accordingly, the content corresponding to the time duration may be selected. In another embodiment, the presentation means may be configured to include a GUI configured for enabling the user to provide an indication of the time instant. For instance, the GUI may include a time dial that may be used to indicate hours, minutes, seconds, milliseconds etc. Accordingly, content corresponding to the time instant indicated by the time dial may be selected.

In another embodiment, the master electronic device 200 may further include a means to create the composition based on each of the one or more composition-inputs and the content captured by the one or more client electronic devices 202. In some embodiments, the composition means may include a processor configured for creating the composition. For example, the processor may be a general purpose processor included in the master electronic device 200 such as, a tablet computer.

Further, in some embodiments, the one or more composition-inputs may include a selection of each of the first client electronic device, a first set of time instants, a second electronic device and a second set of time instants. Further, the composition may include a video. The video may include a plurality of images corresponding to a plurality of time instants. Additionally, a first set of images of the plurality of images may correspond to each of a first client electronic device and a first set of time instants. For instance, the first set of images may correspond to a time duration of content captured by the first client electronic device. As an example, the first set of images may be selected by the user based on the touch input indicating the time duration. Further, a second set of images of the plurality of images may correspond to each of a second client electronic device and a second set of time instants. For instance, the second set of images may correspond to a time duration of content captured by the second client electronic device. Accordingly, in some embodiments, the means to create the composition may be configured to stitch the first set of images to the second set of images in order to obtain the video.

Additionally, in another embodiment, the one or more composition-inputs may include an editing-input. Accordingly, the means to create the composition, such as the processor included in the master electronic device 200 may be further configured to process the composition based on the editing-input. For example, the touch-enabled input module 204 may be configured to receive an editing-input such as, but not limited to, a cropping input. In an instance, the presentation means may be configured to display a crop rectangle over display of content captured by the one or more client electronic devices 202. Accordingly, the user operating the master electronic device 200 may manipulate the crop rectangle using touch input and provide the cropping input. Accordingly, content captured by the one or more client electronic devices 202 may be cropped based on the cropping input.

In another embodiment, the one or more composition-inputs may include an indication of an encoding format. Accordingly, the means to create the composition, such as the processor, may be configured to create the composition based on the encoding format. For instance, the user operating the master electronic device 200 may provide the indication of the encoding format by selecting an encoding option among several encoding options presented on the display means of the master electronic device 200. Examples of the encoding formats may include, but are not limited to, MPEG-2 Part 2, MPEG-4 Part 2, H.264 (MPEG-4 Part 10), HEVC, Theora, Dirac, RealVideo RV40, VP8, and VP9.

In another embodiment, the communication module 206 included in the master electronic device 200 may be further configured to transmit the composition to one or more other electronic devices. For instance, the communication module 206 may be configured to transmit the composition to the one or more client electronic devices 202. Accordingly, users of the one or more client electronic devices 202 may be able to view the composition created by the user. In another embodiment, the communication module 206 may be configured to transmit the composition to a server.

In another embodiment, the touch-enabled input module 204 included in the master electronic device 200 may be further configured receive an indication of a control-input. In some embodiments, the indication of the control-input may include one or more of a touch on a GUI corresponding to the control-input, a depression of a key corresponding to the control-input, a mouse click on a GUI element corresponding to the control-input, a gesture corresponding to the control-input, a voice command corresponding to the control-input, a gesture corresponding to the control-input and a gaze corresponding to the control-input.

In general, the control-input may represent any information that may be used to control a state of one or more of the master electronic device 200 and the one or more client electronic devices 202. For instance, the control-input may represent information about which operation is to be performed, conditions under which the operation is to be performed and how the operation is to be performed. As an example, the control-input may represent information that may be used to enable or disable a functionality of one or more of the master electronic device 200 and the one or more client electronic devices 202. As another example, the control-input may represent information that may be used to trigger one or more of the master electronic device 200 and the one or more client electronic devices 202 to perform one or more operations. Accordingly, the control-input may include an operation indicator corresponding to the one or more operations. Examples of the one or more operations include, but are not limited to, setting one or more parameters corresponding to content capture, initiation of content capture, pausation of content capture, termination of content capture, transformation of captured content, storage of captured content and transmission of captured content.

Further, the control-input may represent information that indicates a context in which the one or more operations are to be performed. The context may generally include values corresponding to situational variables such as, but not limited to, time, place and one or more environmental conditions corresponding to the one or more client electronic devices 202. For example, the context may include range of coordinates of a region. Accordingly, the one or more client electronic devices 202 may be triggered to perform the one or more operations when the one or more client electronic devices 202 are located within the region. As another example, the context may include a range of time values. Accordingly, in some embodiments, each of the master electronic device 200 and the one or more client electronic devices 202 may be triggered to perform the one or more operations at the range of time values. Further, the control-input may also include one or more rules that may specify one or more conditions and corresponding to one or more actions to be performed by the one or more client electronic devices 202. For example, a rule may specify the one or more client electronic devices 202 to initiate capture of content upon detection of a moving object in the field of view of the one or more client electronic devices 202. As another example, a rule may specify initiation of capture of content by each of the master electronic device 200 and the one or more client electronic devices 202 upon detection of a predetermined object in the field of view of each of the master electronic device 200 and the one or more client electronic devices 202.

In an exemplary embodiment, the control-input may include a time value. In general, the time value may be any value based on time. In some embodiments, the time value may indicate one or more instants of time. In another embodiment, the time value may indicate a period of time, such as for example, a duration spanning a start time and an end time.

In an instance, the time value may include a standard time value. The standard time value may be a time value maintained by a time measuring device external to each of the master electronic device 200 and the one or more client electronic devices 202. For example, the standard time value may be maintained by a time keeping device at a national or an international scientific organization. The standard time value may be expressed in units of time such as, but not limited to, year, month, day, hour, minute and second. An example of the standard time value may be 2017 Jan. 1, 10 am.

In another instance, the time value may be a relative time value. The relative time value may be in relation to common time value available to each of the master electronic device 200 and the one or more client electronic devices 202. In an instance, the common time value may be the standard time value. In some embodiments, the standard time value may be maintained by a communication service provider, such as, for example, a cellular communication provider. Accordingly, in some embodiments, each of the master electronic device 200 and the one or more client electronic devices 202 may be configured to receive the standard time value from the cellular communication provider. Further, the relative time value may be expressed in units of time such as, for example, minutes or seconds in relation to the standard time value. In other words, in some embodiments, each of the master electronic device 200 and the one or more client electronic devices 202 may be synchronized to the common time value, such as the standard time value. Accordingly, the relative time value may represent a time differential in relation to the common time value.

In an instance, the time value may include the time at which the indication of the control-input is received through the touch-enabled input module 204 of the master electronic device 200. In another instance, the time value may include the time at which a means configured for capturing content, included in the master electronic device 200, is activated in response to the control-input.

In some embodiments, the master electronic device 200 may include a master timing module configured for measuring time. In an instance, the master timing module may include each of a crystal oscillator and a digital counter. The crystal oscillator may be configured for generating a periodic signal of a predetermined frequency. The digital counter may be configured to count a number of pulses in the periodic signal. In some embodiments, the master timing module may be implemented in the form of firmware included in the master electronic device 200. For example, a smart-phone may include a dedicated timer circuitry configured for measuring time. In another embodiment, the master timing module may be implemented in the form of a general purpose processor included in the master electronic device 200, such as, for example, a processor of a smart-phone. Accordingly, in an instance, the time value may include an output of the master timing module, such as, for example, the output of the digital counter. Further, the one or more client electronic devices 202 may include a client timing module configured for measuring time. The client timing module may be implemented in a manner similar to that of the master timing module. Further, the client timing module may be configured to be synchronized with the master timing module based on the time value.

Further, in some embodiments, in addition to the time value, the touch-enabled input module 204 may be configured to receive an indication of one or more operations. The one or more operations may be, but is not limited to, setting one or more parameters corresponding to content capture, initiation of content capture, pausation of content capture, termination of content capture, transformation of content capture, storage of content capture and transmission of content capture. Accordingly, based on each of the time value and the indication of one or more operations, the one or more client electronic devices 202 may be configured to perform the one or more operations at a time indicated in the time value. For example, the touch-enabled input module 204 in the master electronic device 200 may be configured to receive the indication of control-input including each of an indication to capture content and the time value including a start time and an end time. Accordingly, the one or more client electronic devices 202 may be configured to start capture of content at the start time and terminate capture of content at the end time.

Furthermore, in some embodiments, based on the time value, each of the master electronic device 200 and the one or more client electronic devices 202 may be configured to capture content synchronously. For example, the time value may indicate a time in future when each of the one or more client electronic devices 202 is instructed to capture content of a scene from corresponding viewpoints. Further, the master electronic device 200 may also capture content of the scene from a different viewpoint starting from the time. Accordingly, each of the master electronic device 200 and the one or more client electronic devices 202 may capture content of the scene at the same time but from different viewpoints.

Further, the control-input may represent information that may indicate values of one or more parameters corresponding to one or more of the master electronic device 200 and the one or more client electronic devices 202 to be used while capturing content. The one or more parameters may control how content capture is to be performed. For example, the one or more parameters corresponding to a video camera may include, but are not limited to, resolution, frame rate, white balance, gain, shutter speed, aperture setting and focus.

III. Platform Operation

The following discloses the various operations platform components may be performed. Although methods of FIG. 5-6 have been described to be performed by various components of platform 100, it should be understood that any electronic device (e.g., master electronic device 200, client electronic device 202, a computing device 700 may be configured to perform the various stages of methods of FIG. 5-6 in any reasonable combination or, where feasible, individually. Furthermore, in some embodiments, different operations may be performed by different networked elements in operative communication.

According to another embodiment, a method of creating the composition based on content captured using the one or more client electronic devices is disclosed. Initially, the one or more composition-inputs may be received. In an instance, the one or more composition-inputs may be based on touch. Accordingly, the one or more inputs may be received using the touch-enabled input module. Further, the one or more composition-inputs may be received by the master electronic device. Subsequently, data may be communicated between the master electronic device and the one or more client electronic devices. In an instance, the communication may include wireless reception of content captured by the one or more client electronic devices. Thereafter, the composition may be created based on each of the one or more composition-inputs and the content captured by the one or more client electronic devices. In some embodiments, the content captured by the master electronic device may be synchronous with the content captured by the one or more client electronic devices.

Further, in some embodiments, the method may include receiving the control-input by the master electronic device. Further, the method may include capturing content, by the master electronic device, in response to reception of the control-input. Additionally, the method may include wirelessly transmitting the control-input to the one or more client electronic devices. Further, the one or more client electronic devices may be configured for capturing content in response to the control-input.

In another embodiment, the method may further include presenting each of the content captured by the one or more client electronic devices and the content captured by the master electronic device. In an instance, the presenting may include displaying. Further, the content captured by each of the one or more client electronic devices and the master electronic device may include video. Additionally, the displaying of each of a video captured by the master electronic device and a video captured by the one or more client electronic devices may be synchronous. In another embodiment, the displaying of each of the video captured by the master electronic device and the video captured by the one or more client electronic devices may be synchronous. Further, the displaying of the video captured by the master electronic device may be performed on a master display region of a display means. Additionally, the displaying of the video captured by the one or more client electronic devices may be performed on one or more client display regions of the display means. In some embodiments, the at least one client electronic device may include a plurality of client electronic devices. Further, the displaying of the video captured by a first client electronic device of the plurality of client electronic devices may be performed on a first client display region of the one or more client display regions of the display means. Similarly, the displaying of the video captured by a second client electronic device of the plurality of client electronic devices may be performed on a second client display region of the at least one client display region of the display means.

In some embodiments, the one or more composition-inputs may include a selection of content captured by a client electronic device of the one or more client electronic devices. In another embodiment, the selection of content captured by the client electronic device may correspond to a time instant.

In some embodiments, the composition may include a video. Further, the video may include a plurality of images corresponding to a plurality of time instants. A first set of images of the plurality of images may correspond to each of a first client electronic device and a first set of time instants. Similarly, a second set of images of the plurality of images may correspond to each of a second client electronic device and a second set of time instants. Further, the one or more composition-inputs may include a selection of each of the first client electronic device, the first set of time instants, the second electronic device and the second set of time instants. Accordingly, in some embodiments, creating the composition may include stitching the first set of images to the second set of images.

Further, in another embodiment, the one or more composition-inputs may include an editing-input. Further, creating the composition may include processing the composition based on the editing-input.

In another embodiment, the one or more composition-inputs may include an indication of an encoding format. Further, creating the composition may be based on the encoding format.

In some embodiments, subsequent to creating the composition, the method may include communicating the composition to one or more electronic devices, such as for example, the one or more client electronic devices.

Figure 5:
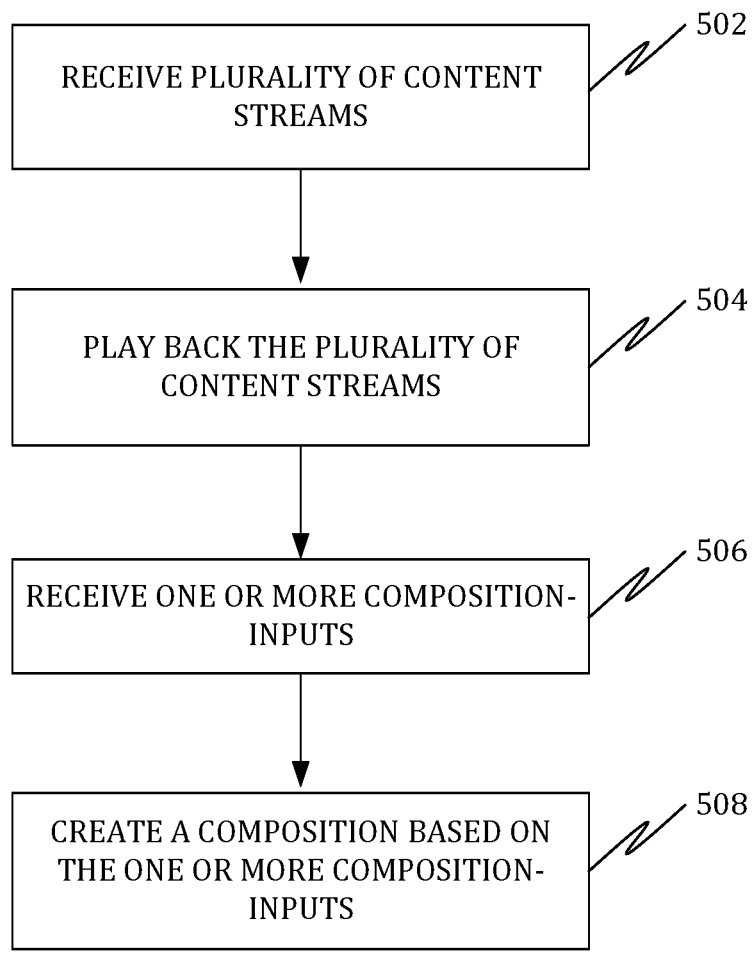
FIG. 5 illustrates a flow chart of a method of creating a composition based on content captured using a plurality of client electronic devices according to some embodiments.

FIG. 5 illustrates a flow chart of a method of creating the composition based on content captured using the plurality of client electronic devices according to some embodiments. At step 502, content from the plurality of client electronic devices may be received, with the communication module. The content may include the plurality of content streams corresponding to each of the plurality of client electronic devices. Subsequently, at step 504, the method may include playing back, with the playback module, the content received from the plurality of client electronic devices. In some embodiments, the playing back of the content from each of the plurality of client electronic devices may be synchronous. Thereafter, at step 506, one or more composition-inputs may be received, with the touch-enabled input module, during the playing back of the content. Further, the one or more composition-inputs may correspond to the selection of the content stream to be included in the composition. Subsequently, at step 508, the composition may be created, with the composition module, based on the one or more composition-inputs.

Figure 6:
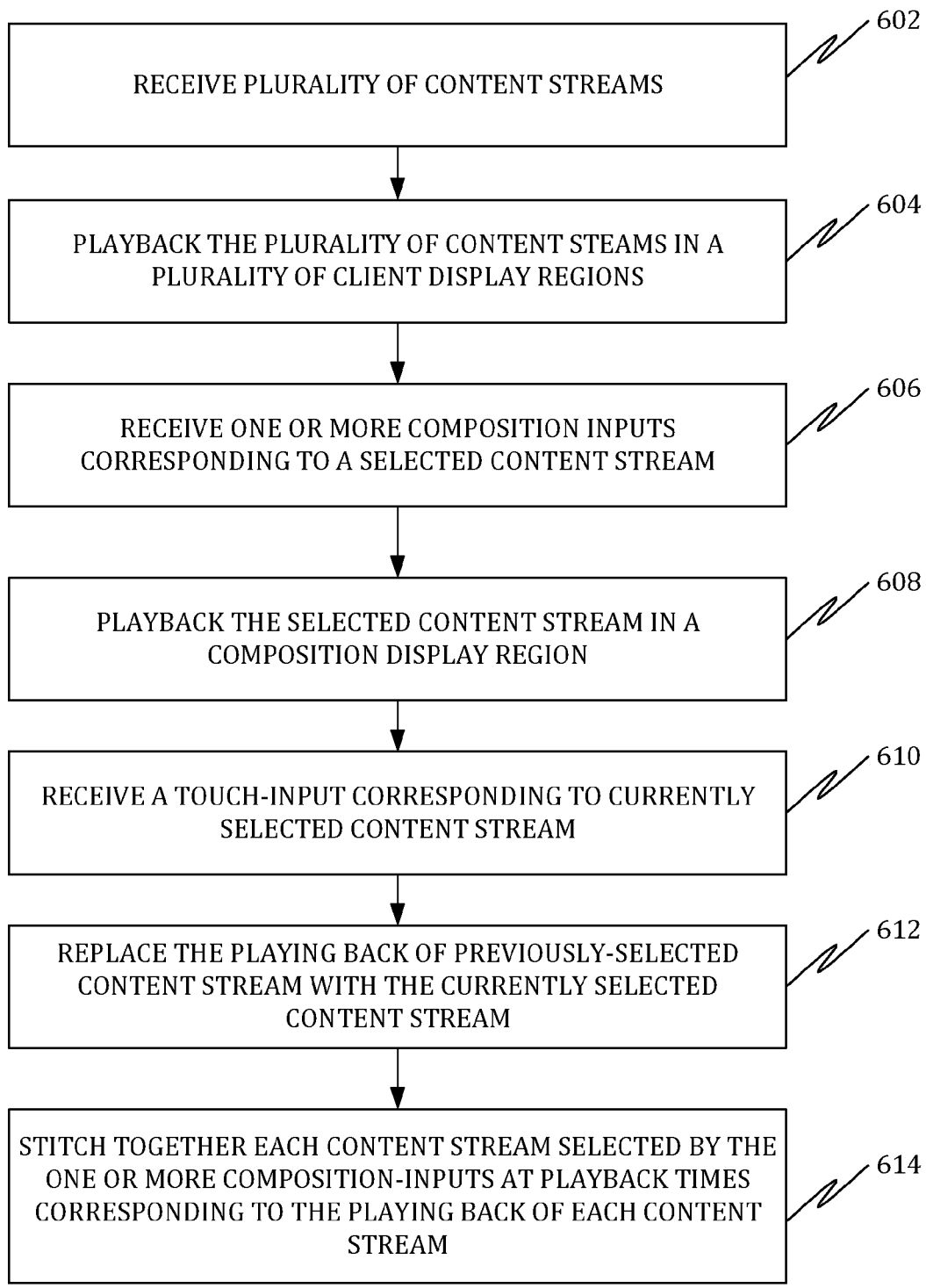
FIG. 6 illustrates a flow chart of a method of creating a composition based on content captured using a plurality of client electronic devices according to another embodiment.

FIG. 6 illustrates a flow chart of a method of creating the composition based on content captured using the plurality of client electronic devices according to another embodiment. At step 602, content from the plurality of client electronic devices may be received, with the communication module. The content may include the plurality of content streams corresponding to each of the plurality of client electronic devices. Subsequently, at step 604, the content streams associated with the plurality of client electronic devices may be played back within the plurality of client display regions. Thereafter, at step 606, one or more composition-inputs may be received, with the touch-enabled input module, during the playing back of the content. Further, the one or more composition-inputs may correspond to the selection of the content stream to be included in the composition. Subsequently, at step 608, the selected content stream may be played back within the composition display region. In some embodiments, the playing back of the selected content stream within the composition display region may continue from a time of playback of the selected content stream within the client display region when the one or more composition-inputs corresponding to the selected content stream were received.

Further, at step 610, a touch input corresponding to a currently selected content stream may be received. Thereafter, at step 612, the playing back of previously-selected content stream may be replaced with a playing back of the currently selected content stream within the composition display region. Subsequently, at step 614, each content stream selected by the one or more composition-inputs at playback times corresponding to the playing back of each content stream within the composition display region may be stitched together using the composition module. As a result, the user of the master electronic device 200 may be able to create the composition conveniently.

In some embodiments, the touch-enabled input module 204, included in the master electronic device 200, may be further configured to receive an invite input. Accordingly, the communication module 206 may be further configured for wireless transmission of an invitation to the one or more client electronic devices 202 based on the invite input. The invitation may correspond to a request to join a content capture session. In some embodiments, the content capture session may include a plurality of electronic devices. Further, the one or more client electronic devices 202 may be configured for reception of the invitation. Furthermore, the one or more client electronic devices 202 may be configured to receive an accept-invite input through a touch-enabled input module included in the one or more client electronic devices 202. As a result, in an instance, a user of the master electronic device 200, such as a first smart-phone, may provide the invite input through the touch-enabled input module 204 included in the first smart phone. The invite input may be provided through a user interface such as a touch screen of the first smart phone. Accordingly, the invitation to capture content may be transmitted to the one or more client electronic devices 202, such as a second smart-phone. Further, the invitation may be presented on a user interface, such as a touch screen, on the second smart-phone. Subsequently, a user of the second smart phone may accept the invitation by providing an accept-invite input through the user interface of the second smart phone. Consequently, each of the first smart phone and the second smart phone may be able to capture content collaboratively. For instance, each of the first smart phone and the second smart phone may be able to capture content of a scene synchronously from different viewpoints.

In another embodiment, a communication module included in the one or more client electronic devices 202 may be further configured for wireless reception of the invitation from the master electronic device 200. The invitation may be a request to participate in a collaborative content capture session. Accordingly, in some embodiments, a touch-enabled input module included in the client electronic device 202 may be further configured for reception of the accept-invite input. Further, the content capturing means included in the client electronic device 202 may be configured to capture content based on reception of the accept-invite input.

In some embodiments, two or more client electronic devices, which are instances of the client electronic device, may receive the invitation to participate in a collaborative content capture session. In another embodiment, the client electronic device 202 may receive the invitation to participate in a collaborative content capture session with the master electronic device 200. In other words, each of the master electronic device 200 and the client electronic device 202 may be configured to collaboratively capture content. For instance, each of the master electronic device 200 and the client electronic device 202 may capture content corresponding to a scene including one or more physical objects. As another instance, the master electronic device 200 may be configured to capture content corresponding to a first scene while the client electronic device 202 may be configured to capture content corresponding to the second scene. Further, in some embodiments, the communication module included in the client electronic device 202 may be configured for wireless transmission of content captured by the client electronic device 202 to the master electronic device 200. In another embodiment, the communication module included in the client electronic device 202 may be configured for wireless transmission of content captured by the electronic device to another client electronic device. Accordingly, in some embodiments, the communication module included in the client electronic device 202 may be further configured for wireless reception of content captured by one or more of the master electronic device 200 and another client electronic device. Further, the communication module 206 included in the master electronic device 200 may be configured for wireless transmission of content captured by the master electronic device 200 to the client electronic device. As a result, in some embodiments, content captured by one or more of the master electronic device 200 and one or more client electronic devices 202 may be shared with the master electronic device 200 and/or one or more client electronic devices 202.

While various embodiments of the disclosed methods and systems have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

IV. Computing Device Architecture

Platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the composition creation platform 100 may be hosted on a centralized server, such as, for example, a cloud computing service. Although methods of FIG. 5-6 have been described to be performed by a computing device 700, it should be understood that, in some embodiments, different operations may be performed by different networked elements in operative communication with computing device 700.

Embodiments of the present disclosure may comprise a system having a memory storage and a processing unit. The processing unit coupled to the memory storage, wherein the processing unit is configured to perform the stages of methods of FIG. 5-6.

Figure 7:
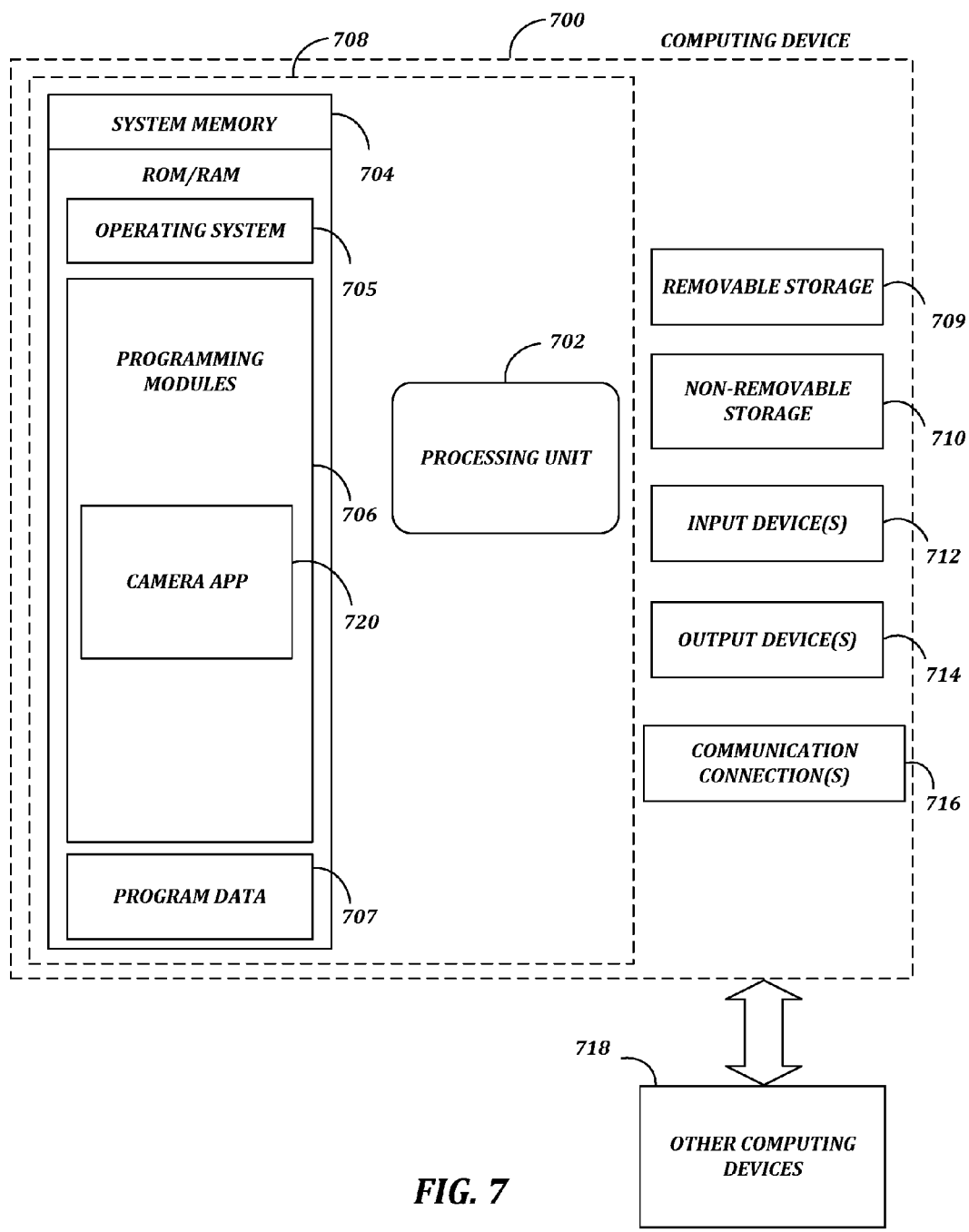
FIG. 7 is a block diagram of a system including a computing device for performing the methods of FIG. 5-6.

FIG. 7 is a block diagram of a system including computing device 700. Consistent with some embodiments of the disclosure, the aforementioned memory storage and processing unit may be implemented in a computing device, such as computing device 700 of FIG. 1. Any suitable combination of hardware, software, or firmware may be used to implement the memory storage and processing unit. For example, the memory storage and processing unit may be implemented with computing device 700 or any of other computing devices 718, in combination with computing device 700. The aforementioned system, device, and processors are examples and other systems, devices, and processors may comprise the aforementioned memory storage and processing unit, consistent with embodiments of the disclosure.

With reference to FIG. 7, a system consistent with some embodiments of the disclosure may include a computing device, such as computing device 700. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a program data 707. Operating system 705, for example, may be suitable for controlling computing device 700's operation. In one embodiment, programming modules 706 may include, for example, a camera app 720. Furthermore, embodiments of the disclosure may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, etc. Output device(s) 714 such as a display, speakers, a printer, etc. may also be included. The aforementioned devices are examples and others may be used.

Computing device 700 may also contain a communication connection 716 that may allow device 700 to communicate with other computing devices 718, such as over a network in a distributed computing environment, for example, an intranet or the Internet. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 704, including operating system 705. While executing on processing unit 702, programming modules 706 (e.g., camera app 720) may perform processes including, for example, one or more of steps of methods of FIG. 5-6 as described above. The aforementioned process is an example, and processing unit 702 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A master electronic device configured to create a composition based on content captured using a plurality of client electronic devices, the master electronic device comprising:
   a control-input module configured to transmit a control-input comprising a time value to at least one of a plurality of client electronic devices, wherein the control-input, in association with a time value, is configured to cause a receiving client electronic device to perform at least one of the following:
      initiate a capture of content,
      pause of the capture of content, and
      terminate of the capture of content;
   a communication module configured to receive content from the plurality of client electronic devices, the content comprising a plurality of content streams corresponding to each of the plurality of client electronic devices;
   a playback module configured to playback the content received from the plurality of client electronic devices, the playback comprising a synchronized playback of the plurality of content streams;
   a touch-enabled input module configured to receive at least one composition-input during the playback of the content, the at least one composition-input corresponding to a selection of a content stream to be included in a composition; and
   a composition module configured to create the composition based on at least one composition-input.

2. The master electronic device of claim 1, wherein the playback module is further configured to:
   playback the content streams associated with the plurality of client electronic devices within a plurality of client display regions; and
   playback a selected content stream within a composition display region.

3. The master electronic device of claim 2, wherein the playback of the selected content stream within the composition display region continues from a time of playback of the selected content stream within a client display region when the at least one composition-input corresponding to the selected content stream was received.

4. The master electronic device of claim 3, wherein the playback module is further configured to replace, within the composition display region, the playback of previously-selected content stream with a playback of a currently selected content stream.

5. The master electronic device of claim 3, wherein the composition module is configured to stitch together each content stream selected by the at least one composition-input at playback times corresponding to the playback of each content stream within the composition display region.

6. The master electronic device of claim 1 further comprising:
   a means to receive an indication of a control-input; and
   a means to capture content in response to reception of the control-input.

7. The master electronic device of claim 1, wherein a client timing module comprised in the plurality of client electronic devices is configured to be synchronized with a master timing module comprised in the master electronic device, wherein a synchronization is based on the time value.

8. The master electronic device of claim 1, wherein the control-input comprises an indication of at least one operation, wherein the plurality of client electronic devices is configured to perform the at least one operation at a time indicated in the time value.

9. The master electronic device of claim 6, wherein each of the master electronic device and the plurality of client electronic devices is configured to capture content synchronously in response to the control-input.

10. The master electronic device of claim 1, wherein the touch-enabled input module is further configured to receive an invite input, wherein the communication module is further configured for wireless transmission of an invitation to the plurality of client electronic devices based on the invite input, wherein the plurality of client electronic devices is configured to receive an accept-invite input.

11. The master electronic device of claim 1, wherein the at least one composition-input comprises an editing-input, wherein the composition module is further configured to process the composition based on the editing-input.

12. A method of creating a composition based on content captured using a plurality of client electronic devices, the method comprising:
   receiving an invite input;
   transmitting an invitation to at least one of a plurality of client electronic devices based on the invite input;
   receiving, with a touch-enabled input module, an accept-invite from at least one of the plurality of client electronic devices;
   receiving, with a communication module, content from the plurality of client electronic devices, the content comprising a plurality of content streams corresponding to each of the plurality of client electronic devices;
   playing back, with a playback module, the content received from the plurality of client electronic devices, wherein the playing back of the content from each of the plurality of client electronic devices is synchronous;
   receiving, with a touch-enabled input module, at least one composition-input during the playing back of the content, the at least one composition-input corresponding to a selection of a content stream to be included in a composition; and
   creating, with a composition module, the composition based on at least one composition-input.

13. The method of claim 12, further comprising:
   playing back, with the playback module, the content streams associated with the plurality of client electronic devices within a plurality of client display regions; and
   playing back, with the playback module, a selected content stream within a composition display region.

14. The method of claim 13, wherein the playing back of the selected content stream within the composition display region continues from a time of playback of the selected content stream within a client display region when the at least one composition-input corresponding to the selected content stream was received.

15. The method of claim 14, further comprising replacing, within the composition display region, the playing back of previously-selected content stream with a playing back of a currently selected content stream.

16. The method of claim 14, further comprising stitching together, with the composition module, each content stream selected by the at least one composition-input at playback times corresponding to the playing back of each content stream within the composition display region.

17. The method of claim 12, further comprising:
receiving, with the touch-enabled input module, an indication of a control-input; and
capturing, with a content capturing means, in response to reception of the control-input.

18. The method of claim 17, further comprising wirelessly transmitting, with the communication module, the control-input to the plurality of client electronic devices, wherein the plurality of client electronic devices is configured for capturing content in response to the control-input.

19. The method claim 17, wherein the control-input comprises a time value.

20. The method of claim 19, wherein the time value corresponds to at least one of initiation of capture of the content, pausation of capture of the content and termination of capture of the content.

21. The method claim 19, further comprising, synchronizing a client timing module comprised in the plurality of client electronic devices with a master timing module comprised in the master electronic device, wherein the synchronization is based on the time value.

22. The method of claim 19, wherein the control-input comprises indication of at least one operation, wherein the plurality of client electronic devices is configured for performing the at least one operation at a time indicated in the time value.

23. The method of claim 17, further comprising synchronously capturing content with each of the master electronic device and the plurality of client electronic devices in response to the control-input.

24. The method of claim 12 further comprising:
receiving, with the touch-enabled input module, an invite input;
wirelessly transmitting, with the communication module, an invitation to the plurality of client electronic devices based on the invite input; and
receiving, with a touch-enabled input module, an accept-invite at the plurality of client electronic devices.

25. The method of claim 12 further comprising:
receiving, with the touch-enabled input module, an editing-input; and
processing, with the composition module, the composition based on the editing-input.

26. A master electronic device configured to create a composition based on content captured using a plurality of client electronic devices, the master electronic device comprising:

a communication module configured to:
invite, in response to an invite-input, a plurality of client electronic devices specified in the invite-input;
receive an acceptance of the invite from the plurality of client electronic devices;
receive content from a plurality of client electronic devices, the content comprising a plurality of content streams corresponding to each of the plurality of client electronic devices;
a playback module configured to playback the content received from the plurality of client electronic devices, the playback comprising a synchronized playback of the plurality of content streams;
a touch-enabled input module configured to receive at least one composition-input during the playback of the content, the at least one composition-input corresponding to a selection of a content stream to be included in a composition; and
a composition module configured to create the composition based on at least one composition-input.

27. A method of creating a composition based on content captured using a plurality of client electronic devices, the method comprising:
transmitting a control-input comprising a time value to at least one of a plurality of client electronic devices, wherein the control-input, in association with the time value, is configured to cause a receiving client electronic device to perform at least one of the following:
initiate a capture of content,
pause of the capture of content, and
terminate of the capture of content;
receiving, with a communication module, content from the plurality of client electronic devices, the content comprising a plurality of content streams corresponding to each of the plurality of client electronic devices;
playing back, with a playback module, the content received from the plurality of client electronic devices, wherein the playing back of the content from each of the plurality of client electronic devices is synchronous;
receiving, with a touch-enabled input module, at least one composition-input during the playing back of the content, the at least one composition-input corresponding to a selection of a content stream to be included in a composition; and
creating, with a composition module, the composition based on at least one composition-input.

\* \* \* \* \*